(12) United States Patent
Brufau Redondo

(10) Patent No.: US 9,969,132 B2
(45) Date of Patent: May 15, 2018

(54) SYSTEM FOR FORMING STACKS OF COMPOSITE MATERIALS

(71) Applicant: Applus Servicios Tecnologicos, S.L., Bellaterra (Barcelona) (ES)

(72) Inventor: Jordi Brufau Redondo, Bellaterra (ES)

(73) Assignee: APPLUS SERVICIOS TECNOLOGICOS, S.L., Bellaterra (Barcelona) (ES)

( * ) Notice: Subject to any disclaimer, the term of this patent is extended or adjusted under 35 U.S.C. 154(b) by 0 days. days.

(21) Appl. No.: 14/889,300

(22) PCT Filed: May 8, 2013

(86) PCT No.: PCT/ES2013/070291
§ 371 (c)(1),
(2) Date: Nov. 5, 2015

(87) PCT Pub. No.: WO2014/181003
PCT Pub. Date: Nov. 13, 2014

(65) Prior Publication Data
US 2016/0082675 A1 Mar. 24, 2016

(51) Int. Cl.
*B29C 70/50* (2006.01)
*B29C 53/04* (2006.01)
(Continued)

(52) U.S. Cl.
CPC ............ *B29C 70/504* (2013.01); *B29C 53/04* (2013.01); *B29C 70/386* (2013.01); *B30B 5/02* (2013.01);
(Continued)

(58) Field of Classification Search
CPC ................ B29C 70/504; B29C 70/386; B29C 2043/3233; B29C 2043/3222; B29C 2043/3649; B29C 2043/461; B29C 43/46; B29C 33/308; B29C 43/224; B29C 70/521; B29C 70/526; B29C 53/04; B30B 5/02
See application file for complete search history.

(56) References Cited

U.S. PATENT DOCUMENTS 5,078,821 A    1/1992   Garvey
5,846,464 A *  12/1998  Hoffman ................ B23Q 1/035
                                                      249/155
(Continued)

FOREIGN PATENT DOCUMENTS

GB       1459105 A  * 12/1976  ............. C03B 25/08
WO    2013064187 A1     5/2013

*Primary Examiner* — William P Bell
(74) *Attorney, Agent, or Firm* — Hayes Soloway PC

(57) ABSTRACT

The system for forming stacks of composite materials comprises a form (1) which defines the section that is desired to provide to a stack (2) of composite material placed thereon to obtain a formed stack (2'); a counter-form (3), which together with the form (1), forms and obtains the formed stack (2'); and it is characterized in that the system also comprises transition elements (4) deformable, that adopt a variable section from an initial section in one of its ends and the end section defined by the form (1) in the other end.
It allows changing the geometry during the forming of the laminate, to obtain laminates of variable section along its length. For this purpose, the form and counter-form must have a variable geometry at will.

13 Claims, 6 Drawing Sheets

(51) Int. Cl.
*B30B 5/02* (2006.01)
*B29C 70/38* (2006.01)
*B29K 101/00* (2006.01)
*B29L 7/00* (2006.01)
*B29L 9/00* (2006.01)

(52) U.S. Cl.
CPC ..... *B29K 2101/00* (2013.01); *B29L 2007/008* (2013.01); *B29L 2009/00* (2013.01)

(56) References Cited

U.S. PATENT DOCUMENTS

| | | |
|---|---|---|
| 7,249,943 B2 | 7/2007 | Benson et al. |
| 2005/0028925 A1* | 2/2005 | Fernandes ............. B29B 15/122 156/269 |
| 2011/0247751 A1* | 10/2011 | Steyer ................. B29C 65/1632 156/272.8 |

* cited by examiner

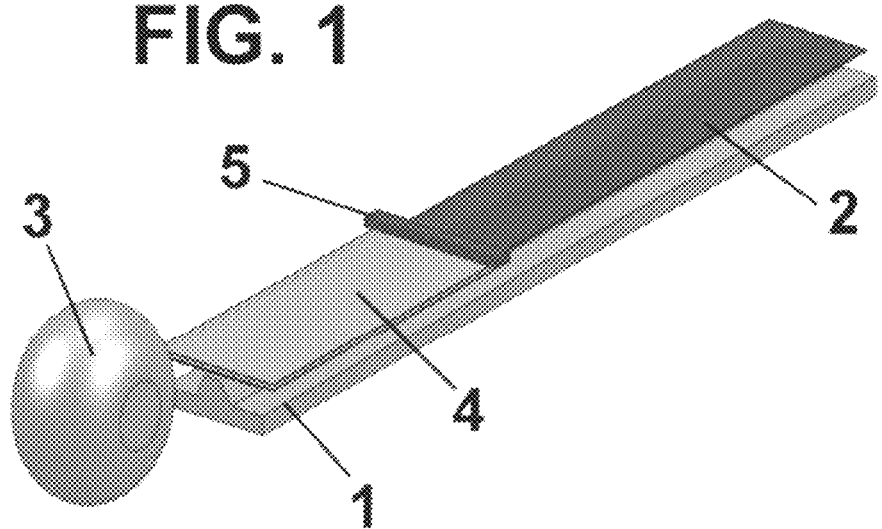
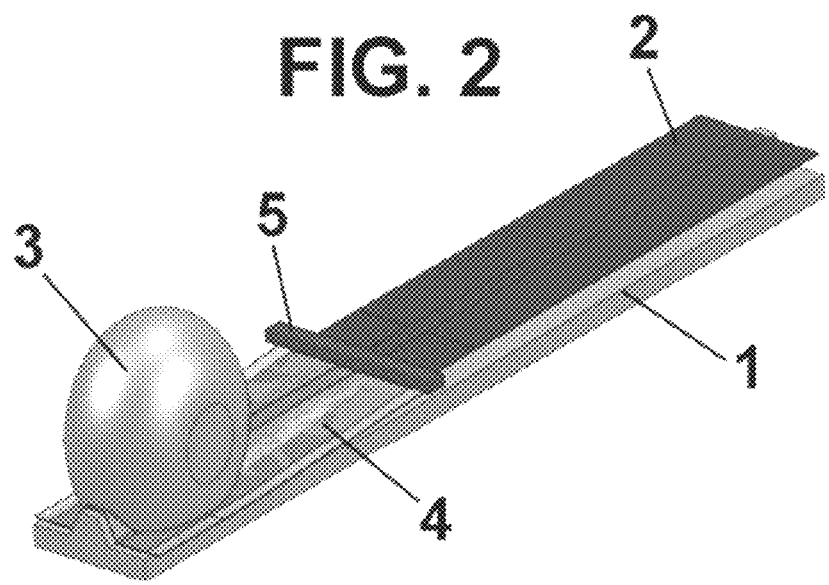

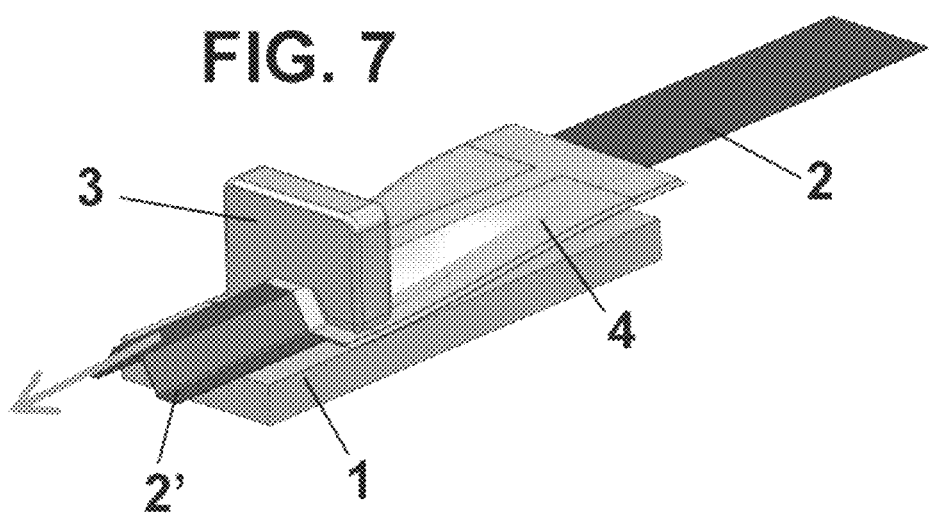
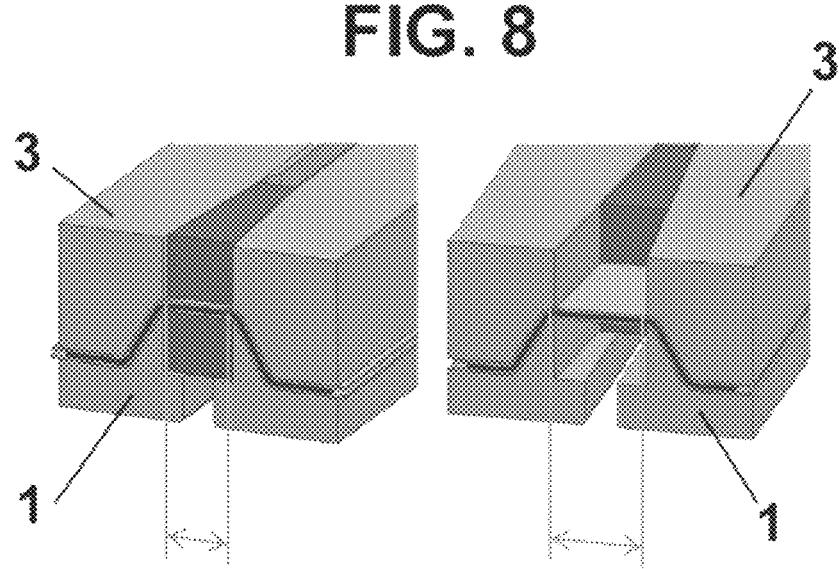

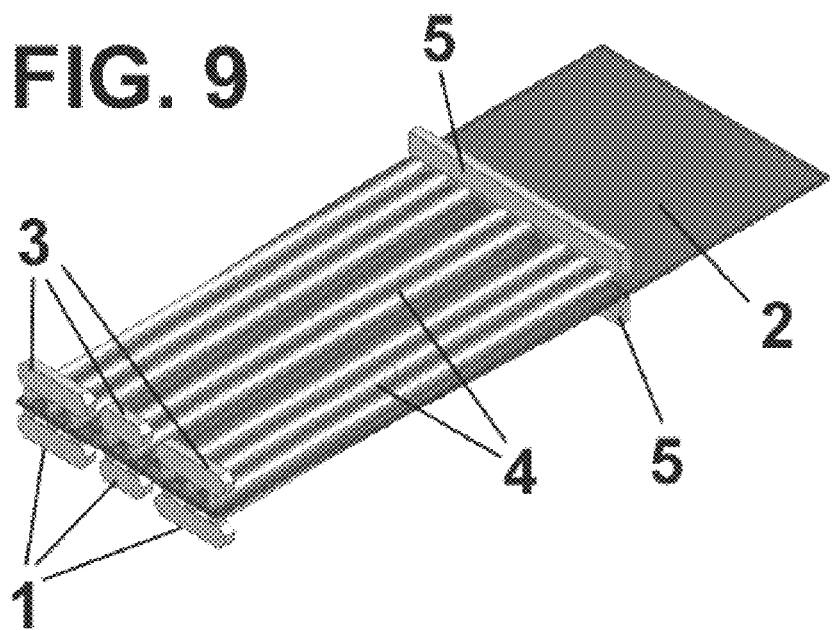
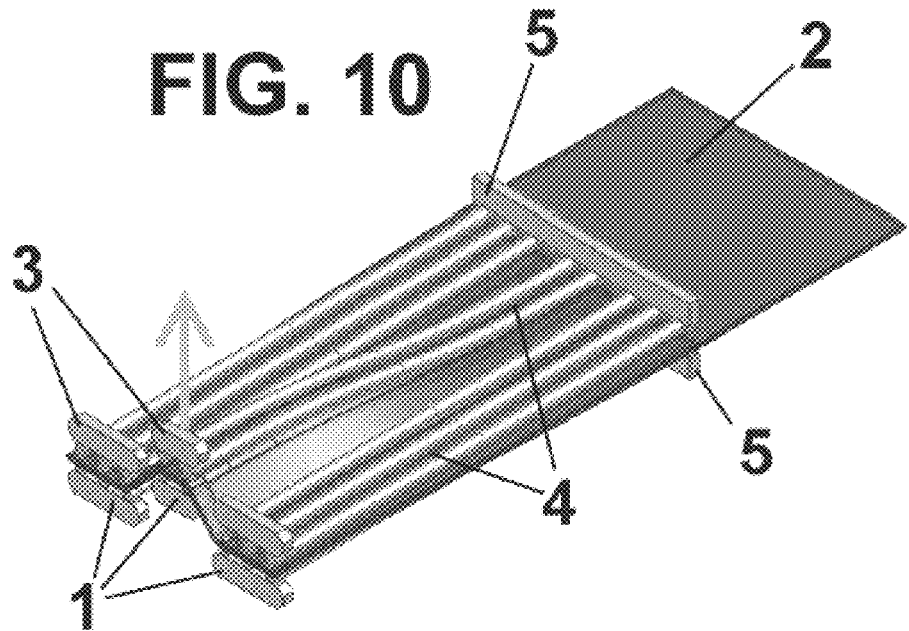

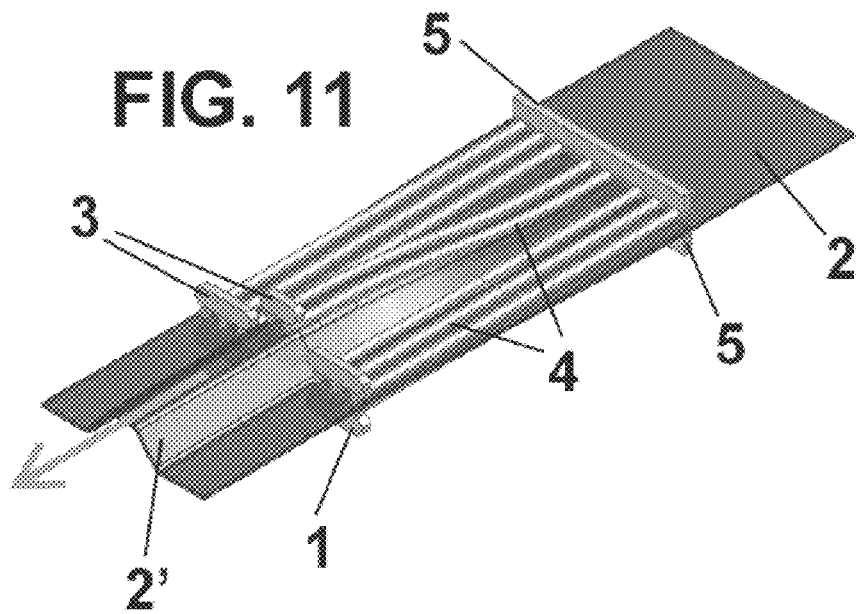
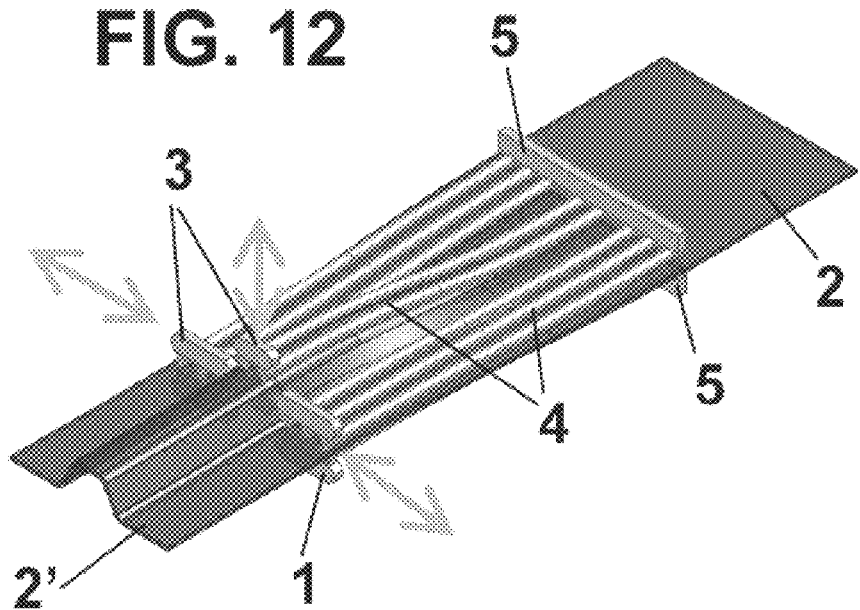

SYSTEM FOR FORMING STACKS OF COMPOSITE MATERIALS

OBJECT OF THE INVENTION

The present invention refers to a system for forming stacks of composite materials; where which said system has application in the technical field of systems for forming stacks of prepreg composite materials, particularly in the area of systems for continuous production of profiles of these stacks.

This system aims to automate the process of forming stacks of composite materials, formed from different physical entities and stages, where the number of entities and stages are highly flexible to form complex geometries of these stacks of composite materials.

BACKGROUND OF THE INVENTION

As an introduction, it is known that the pieces obtained from stacked composite materials, such as those formed of carbon fiber sheets or glass fibers pre-impregnated with resin ("prepreg"), are widely employed in industry, such as in the aeronautics industry components including stringers, stiffeners and structural reinforcements. These components are characterized by their low weight and high mechanical strength (specific resistance).

One of the existing technologies for the continuous formation of composite laminates is based on a system of rollers and mandrel (roll-forming), originally conceived for manufacturing metal sections. Metal rollers press the composite against the surface of the mandrel debulking the composite and giving it the shape of the mandrel. The part obtained is then cured in an autoclave.

U.S. Pat. No. 7,249,943-B2 discloses an apparatus for forming stiffeners and other elements of reinforcement of composites, comprising a base having in its upper part a longitudinal mandrel with the shape to be given to the laminate arranged thereon, as well as one or several rollers assembled in one or several supports, such that the rollers roll over the composite pressing it against the mandrel for forming it and obtaining the composite part with the desired geometry and ready to be cured. The rolling surface of the rollers has a configuration complementary to the cross-section of the mandrel. Although this apparatus allows manufacturing straight structural sections with changes in thickness and bends, it is not capable of manufacturing more complex geometries, such as for example geometries with changes in plane for overcoming obstacles (joggles), twisted geometries, etc.

Furthermore, even for obtaining simple geometric shapes, such as for example components with an omega-shaped cross-section, it is necessary to have several rollers, all provided with their respective pressure adjustment systems, which complicates and makes the structure of such systems more expensive and jeopardizes the quality of the part obtained due to the occurrence of wrinkles when the rollers act on the composite.

The main drawback of these known systems is their inability to form variable section laminates, since these changes of geometry involve changing the rollers.

To overcome these drawbacks it was designed the system described in PCT/EP2011/069330, from the same applicant as this present application, and unpublished at the time of submission of this application.

This document describes the use of a pneumatic cover with pressurized fluid in its interior, which presses the laminate against a mandrel to form it.

Therefore, the purpose of the present invention to improve the system described in PCT/EP2011/069330, providing a series of advantages which will be explained later.

DESCRIPTION OF THE INVENTION

This system for forming stacks of composite materials of the present invention manages to solve the aforesaid drawbacks, while presenting further advantages which will be described below.

The system for forming stacked composite materials of present invention comprises:
   a form defining the section to be provided to a stack of composite materials placed onto this form to obtain a formed stack;
   a counter-form, that together with the form, form and obtain the formed stack
and is characterized in that it also comprises:
   deformable transition elements that adopt a variable section from an initial section, preferably flat, at one of its ends and the end section defined by the form at the other end.

Advantageously, said counter-form or said stacked composite material or said transition elements are movable longitudinally along the system.

Preferably, said transition elements provide head, and are positioned above and/or below said stacked composite material.

Advantageously, said counter-form is adaptively, and according one embodiment, said counter-form is formed by a flexible container.

In this embodiment, said flexible container forming the counter-form may comprise a filler, such as a plurality of particles.

According to one embodiment, said transition elements may be formed of membranes or tissues.

Also, if desired, said form is of variable transversal section along its length.

According to an alternative embodiment, said transition elements are composed by a plurality of longitudinal rods and the form and counter-form consists of supports placed in one of the ends of said longitudinal rods.

In this embodiment, these longitudinal rods forming the shape are positioned below said stacked composite material, and said longitudinal rods which form the counter-form are placed over said stacked composite material.

The system of this invention has the following advantages:

The transition elements define a nozzle, flexible and adaptable to different geometries, depending on the form and counter-form used.

It allows changing the geometry during the forming of the laminate, to obtain laminates of variable section along its length. For this purpose, the form and counter-form must have a variable geometry at will.

It allows forming laminates of variable thickness and composition. Thus, laminates can be formed of variable section and no-straight geometry.

It allows that the threading of the laminate inside the nozzle can be performed automatically, because the nozzle and the initial part of the laminate can be formed simultaneously. That is, the laminate can be flat between the two transition elements at the time of forming the nozzle with the form and the final counter-form, so that the initial part of the laminate will be already partly formed and threaded in the nozzle.

An important advantage of the forming on mandrel by rollers, whether rigid, elastic, inflatable or with particulate is that the transition elements generate by friction a traction which tightens the laminate and prevents the occurrence of wrinkles, which in case of rollers yes they could be formed and remain in the laminate when pressed by the rollers.

In particular, regarding the unpublished PCT/EP2011/069330 document cited above, the advantages of the present invention are:
- The transition elements regulate perfectly the temperature;
- The transition elements exert a traction force all over the laminate, which prevents the formation of wrinkles;
- The transition elements allow to work on a cold tooling, since only the area used for forming is heated, limiting the inherent problems of thermal expansion and contraction, thus avoiding wrinkles and/or the need to use materials with high cost in certain components of the system of the present invention, while also enabling the reduction of energy consumption;
- The transition elements may be complemented by rollers or not;
- For laminates of straight directrix, the transition elements allow forming nozzles without the need of the length of the mandrel being the same of the length of the laminates.
- It allows performing the forming with standard elements not tailored for a specific geometry.

BRIEF DESCRIPTION OF THE DRAWINGS

In order to complement the description being made and with the aim to help better understanding of the characteristics of the invention, are attached as a part of said description, a set of drawings wherein by way of illustration and not limiting, has been represented the following:

FIGS. 1 to 3 are perspective views of the system for forming stacks of composite materials of the present invention as a first embodiment, which represent the stages of forming a stack;

FIGS. 5 to 7 are perspective views of the system for forming stacks of composite materials of the present invention according to a second embodiment, which represent the stages of forming a stack;

FIG. 8 is a perspective view of a variant of the system for forming stacks of composite materials of the present invention, according to an alternative of said second embodiment;

FIGS. 9 to 12 are perspective views of the system for forming stacks of composite materials of the present invention, according to a third embodiment, which represent the stages of forming a stack.

DESCRIPTION OF PREFERRED
EMBODIMENTS OF THE INVENTION

Figure 3:
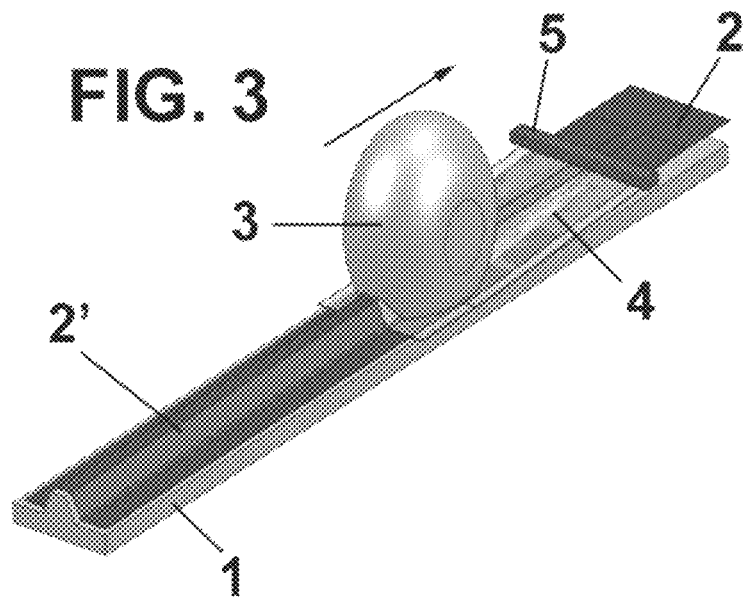

In FIGS. 1 to 3 is shown a first embodiment of the system for forming stacks of composite materials according to a first embodiment.

According to this first embodiment, the system of the present invention comprises a form 1, for example an elongated mandrel 1. This form 1 has a complex geometry, for example a Ω-shaped, that is the one that wants to be provided to a stack 2 of composite material, which is placed on said form 1 (right side of FIGS. 1 to 3).

The system of the present invention also comprises the transition elements 4, which can provide heat. The function of these transition elements 4 is to define a nozzle flexible and adaptable to different geometries.

In the case of providing heat, they also have the function of heating the stack 2 and pre-forming it. Said stack may comprise different types of materials, such as thermoset materials, which are formed at a temperature of about 80° C., and/or thermoplastic materials, which are formed at a temperature of about 300° C.

Said transition elements 4 are placed in this case above and below the stack 2, and can be formed by membranes or tissues, but may be placed only above or below. In the embodiment shown, these transition elements 4 are tissues, for example, thermal blankets.

Must be noted that it is important that the transition elements 4 are adaptable, meaning that they can be adapt to the shape defined by the form 1.

The system to the present invention also comprises a counter-form 3, which in this embodiment is also flexible or adaptable, i.e. also adapts to the shape defined by said form 1.

According to this first embodiment, said counter-form 3 is composed of a container, such as a bladder, which can contain a filler, such as particles, lead shots, magnetic particles, or pressurized air, or a combination thereof. The function of said filler of particles is to allow a better adaptation of counter-form 3 to the complex shape defined by the form 1, particularly if small radii dimensions are defined. Must be noted that the dimensions of the particles, if any, will correspond to said complex shape.

In the embodiment shown, said counter-form 3 is movable along the form 1 as shown in FIGS. 1 to 3.

The process of forming the stack 2 is as follows:

Firstly (FIG. 1), the stack is placed on the form 1 longitudinally, being the transition elements 4 positioned above and below said stack 2, providing to the stack 2 a proper temperature for heating and preforming, in such a case.

Said transition elements 4, in addition must be sufficiently tensed to avoid wrinkles occur and to adapt perfectly to the shape defined by the form 1. The initial geometry is given by two flat steel plates 5, placed at the front of the transition elements.

Once said stack 2 is at the appropriate temperature, (FIG. 2) the counter-form 3 is moved along the form 1 in the direction shown by the arrow in FIG. 3. When the counter-form is placed on the transition elements it presses their ends against the form, and requires them to adopt its geometry, thus being formed the transition nozzle with the end of the stack, threaded thereon, as shown in FIG. 2. Thus is been conformed the transition nozzle with the end of the laminate 2 inside, and also conformed the transition of this and the threaded in the nozzle.

Then, the set that forms the nozzle is moved along the stack and the mandrel to form the stack along all its length (2'), as presented in FIG. 3.

Figure 4:
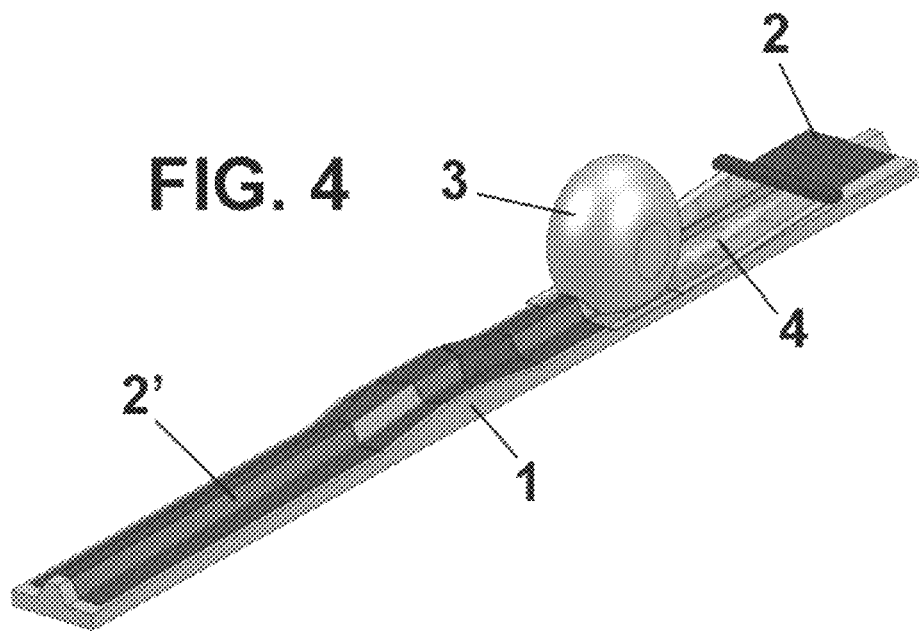
FIG. 4 is a perspective view of a variant of the system for forming stacks of composite materials of the present invention, as an alternative of said first embodiment.

In FIG. 4 has been represented a variant of this first embodiment, in which the form 1 is from variable section. In this case, when the transition elements 4 and the counter-form 3 are moved along the form, the transition elements 4 are changing too their section along its length, thanks to its flexible or adaptable nature, and will form the laminate 2, adapting them to the different sections of the form 1 in all its length, as well to the curves that it presents.

Figure 5:
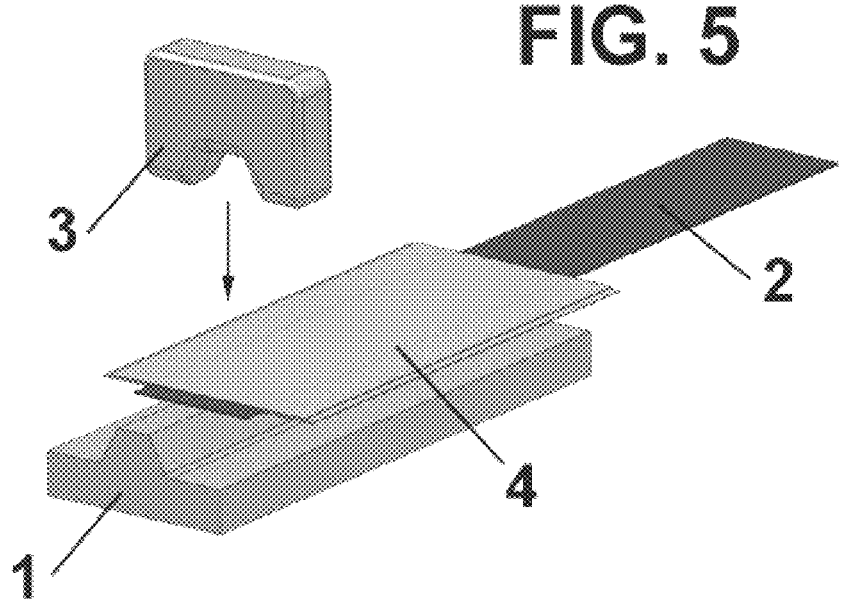
Figure 6:
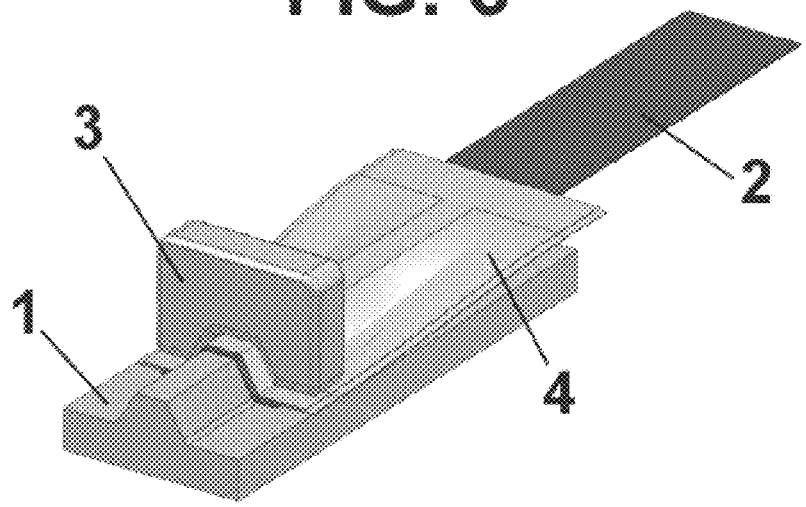

In the FIGS. 5 to 7 is represented a second embodiment from the system of the present invention. For simplicity, in the description of this embodiment, are used the same reference numerals to designate equivalent elements.

In comparison to the first embodiment, here the nozzle defined by the transition elements 4, which are blankets too, the form 1 and the counter-form 3 remain static, and is pulled the laminate 2 which passes through the nozzle, so that, it enters flat-shaped from one side and leaves formed of the other side.

The end of the laminate 2 is disposed between the two transition elements 4, still flat, and they are heated so that is also heated the laminate 2. Then, the rear end of the transition elements 4 is confined, being pressed between the form 1 and the counter-form 3.

Thus, the transition nozzle is configured with the end of laminate 2 inside and the transition also conformed in the laminate 2. Then, the laminate 2 is pulled to pass it through the nozzle in this way formed so that it is being warmed and formed.

In FIG. 8 it has been represented a variant of this embodiment, in which the cross section of form 1 and counter-form 3 is variable.

In FIGS. 9 to 12 is represented a third embodiment of the system of the present invention. For simplicity, in the description of this embodiment, are used the same reference numerals to designate equivalent elements.

In this embodiment, the transition elements 4 are formed by a plurality of longitudinal rods, and said rods are considered that form a flexible nozzle, since their relative position can be varied between them vertically and transversally, as can be seen in the figures. Also in this case, must be indicated that the rods will have a diameter suitable to perfectly adapt to the shape defined by the form 1 and the counter-form 3.

In this third embodiment, the form 1 and counter-form 3 are formed by supports located at one of the ends of said rods, being the supports of the form 1 below the laminate 2, and the supports of the counter-form 3 above the laminate 2.

As shown by the arrows in FIG. 12, said supports are movable vertically and transversally to define the section of the laminate 2 that is desired.

In this third embodiment, as in the second embodiment, the forming of the laminate 2 is carried out pulling from the same laminate 2, as indicated by the arrow in the FIG. 11.

In view of this description and set of figures, an expert in the art will understand that embodiments of the invention that have been described can be combined in multiple ways within the object of the invention. The invention has been described according to some preferred embodiments thereof, but for an expert in the art will be evident that multiple variations can be introduced in said preferred embodiments without exceeding the object of the claimed invention.

The invention claimed is:

1. A system for forming stacks of composite materials, the system comprising:
   a form which defines a section that is desired to provide to a stack of composite material placed thereon to obtain a formed stack;
   a counter-form, which together with the form, forms and obtains the formed stack; and
   a plurality of deformable transition elements, that adopt a variable section from an initial section in one of its ends and an end section defined by the form in the other end, wherein the transition elements are positioned above and below the stack of composite material, defining a nozzle, flexible and adaptable to different geometries, that is configured to move relative to the stack of composite material such that it generates by friction a traction which frictionally tightens the stack.

2. System for forming stacks of composite materials according to claim 1, wherein said counter-form or said stack of composite material or said transition elements are movable longitudinally along the system.

3. System for forming stacks of composite materials according to claim 1, wherein said transition elements provide heat.

4. System for forming stacks of composite materials according to claim 1, wherein said counter-form is adaptable.

5. System for forming stacks of composite materials according to claim 4, wherein said counter-form consists of a flexible container.

6. System for forming stacks of composite materials according to claim 5, wherein said flexible container, forming the counter-form, comprises a filler.

7. System for forming stacks of composite materials according to claim 6, wherein said filler is a plurality of particles.

8. System for forming stacks of composite materials according to claim 1, wherein said transition elements are formed by membranes or tissues.

9. System for forming stacks of composite materials according to claim 1, wherein said form is of varying cross section along its length.

10. System for forming stacks of composite materials according to claim 1, wherein said transition elements consist of a plurality of rods or a plurality of longitudinal plates.

11. System for forming stacks of composite materials according to claim 10, wherein the form and the counter-form are formed by supports placed in one of the ends of said rods.

12. System for forming stacks of composite materials according to claim 11, wherein said rods are positioned below said stack of composite material.

13. System for forming stacks of composite materials according to claim 11, wherein said rods are placed above said stack of composite material.

* * * * *